US010002608B2

(12) United States Patent
Bangalore et al.

(10) Patent No.: US 10,002,608 B2
(45) Date of Patent: Jun. 19, 2018

(54) SYSTEM AND METHOD FOR USING PROSODY FOR VOICE-ENABLED SEARCH

(75) Inventors: Srinivas Bangalore, Morristown, NJ (US); Junlan Feng, Basking Ridge, NJ (US); Michael Johnston, New York, NY (US); Taniya Mishra, New York, NY (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 1143 days.

(21) Appl. No.: 12/884,959

(22) Filed: Sep. 17, 2010

(65) Prior Publication Data

US 2012/0072217 A1 Mar. 22, 2012

(51) Int. Cl.
*G10L 15/18* (2013.01)
*G10L 25/54* (2013.01)
*G10L 25/63* (2013.01)
*G10L 15/22* (2006.01)

(52) U.S. Cl.
CPC .......... *G10L 15/1807* (2013.01); *G10L 25/54* (2013.01); *G10L 25/63* (2013.01); *G10L 2015/226* (2013.01); *G10L 2015/227* (2013.01)

(58) Field of Classification Search
CPC ................. G10L 15/08; G10L 15/1807; G10L 2015/226–2015/227; G10L 25/63; G10L 25/54
USPC ........ 704/207, 251, 257, 270, 275; 707/706, 707/748
See application file for complete search history.

(56) References Cited

U.S. PATENT DOCUMENTS

| | | | | |
|---|---|---|---|---|
| 5,987,415 A | * | 11/1999 | Breese | G10L 17/26 704/270 |
| 6,877,001 B2 | * | 4/2005 | Wolf et al. | 707/711 |
| 7,181,398 B2 | * | 2/2007 | Thong et al. | 704/254 |
| 7,209,880 B1 | * | 4/2007 | Gajic et al. | 704/231 |
| 7,280,968 B2 | * | 10/2007 | Blass | 704/266 |
| 8,214,210 B1 | * | 7/2012 | Woods | 704/236 |

(Continued)

OTHER PUBLICATIONS

Pon-Barry et al. "Identifying uncertain words within an utterance via prosodic features." In Proceedings of the 10th Annual Conference of the International Speech Communication Association (Interspeech 2009), Brighton,U.K., Sep. 6-10, 2009, pp. 1-4.*

(Continued)

*Primary Examiner* — James Wozniak

(57) ABSTRACT

Disclosed herein are systems, methods, and non-transitory computer-readable storage media for approximating relevant responses to a user query with voice-enabled search. A system practicing the method receives a word lattice generated by an automatic speech recognizer based on a user speech and a prosodic analysis of the user speech, generates a reweighted word lattice based on the word lattice and the prosodic analysis, approximates based on the reweighted word lattice one or more relevant responses to the query, and presents to a user the responses to the query. The prosodic analysis examines metalinguistic information of the user speech and can identify the most salient subject matter of the speech, assess how confident a speaker is in the content of his or her speech, and identify the attitude, mood, emotion, sentiment, etc. of the speaker. Other information not described in the content of the speech can also be used.

17 Claims, 4 Drawing Sheets

(56) References Cited

U.S. PATENT DOCUMENTS

| | | | |
|---|---|---|---|
| 8,401,853 | B2 | 3/2013 | Johnston et al. |
| 2002/0010584 | A1* | 1/2002 | Schultz et al. ............... 704/270 |
| 2002/0077825 | A1* | 6/2002 | Silverman ............... G10L 17/26 704/270 |
| 2003/0182123 | A1* | 9/2003 | Mitsuyoshi ............. G10L 17/26 704/270 |
| 2003/0204399 | A1* | 10/2003 | Wolf et al. .................... 704/251 |
| 2003/0204492 | A1* | 10/2003 | Wolf et al. ........................ 707/3 |
| 2004/0002853 | A1* | 1/2004 | Clavbo ................... G10L 25/90 704/205 |
| 2005/0273318 | A1* | 12/2005 | Zhou et al. ...................... 704/10 |
| 2005/0273338 | A1* | 12/2005 | Aaron et al. ................. 704/267 |
| 2006/0036751 | A1* | 2/2006 | Garbow et al. .............. 709/229 |
| 2006/0122834 | A1* | 6/2006 | Bennett ............... G10L 15/1822 704/256 |
| 2007/0038436 | A1* | 2/2007 | Cristo et al. ....................... 704/9 |
| 2008/0082333 | A1* | 4/2008 | Nurminen .............. G10L 21/00 704/250 |
| 2008/0103780 | A1 | 5/2008 | Dacosta |
| 2008/0104049 | A1* | 5/2008 | Richardson et al. ............. 707/5 |
| 2008/0120094 | A1* | 5/2008 | Mate et al. .................... 704/201 |
| 2008/0172359 | A1* | 7/2008 | Lundell et al. ................... 707/3 |
| 2009/0006085 | A1* | 1/2009 | Horvitz .................. G10L 17/26 704/223 |
| 2009/0037174 | A1 | 2/2009 | Seltzer et al. |
| 2009/0138356 | A1* | 5/2009 | Pomplun ......................... 705/14 |
| 2009/0204395 | A1* | 8/2009 | Kato ...................... G10L 13/033 704/206 |
| 2009/0232296 | A1* | 9/2009 | Jaiswal .................. G10L 17/26 379/265.12 |
| 2010/0003969 | A1* | 1/2010 | Isobe et al. ................. 455/412.1 |
| 2010/0036660 | A1* | 2/2010 | Bennett .................. G10L 17/26 704/231 |
| 2010/0154015 | A1 | 6/2010 | Kang et al. |
| 2010/0205541 | A1* | 8/2010 | Rapaport et al. ............. 715/753 |
| 2010/0246799 | A1* | 9/2010 | Lubowich ............. G10L 15/142 379/265.09 |
| 2011/0004473 | A1* | 1/2011 | Laperdon et al. ............ 704/243 |
| 2011/0004474 | A1* | 1/2011 | Bansal .................. H04H 60/45 704/246 |
| 2011/0004624 | A1* | 1/2011 | Bansal ............. G06F 17/30864 707/776 |
| 2011/0196678 | A1* | 8/2011 | Hanazawa .................... 704/251 |
| 2011/0276327 | A1* | 11/2011 | Foxenland ............. G10L 15/26 704/235 |
| 2012/0022866 | A1 | 1/2012 | Ballinger et al. |
| 2012/0035917 | A1* | 2/2012 | Kim ........................ G10L 13/10 704/200.1 |
| 2012/0072217 | A1* | 3/2012 | Bangalore et al. ........... 704/243 |
| 2012/0089396 | A1* | 4/2012 | Patel et al. .................... 704/249 |
| 2012/0290508 | A1* | 11/2012 | Bist ................................. 706/10 |

OTHER PUBLICATIONS

Chen et al. "Improved spoken document retrieval by exploring extra acoustic and linguistic cues." Proceedings of the 7th European Conference on Speech Communication and Technology. vol. 1. 2001, pp. 1-4.*

Johnson, Michael T. "Incorporating prosodic information and language structure into speech recognition systems". Diss. Purdue University, Aug. 2000, pp. 1-205.*

Ariki, et al. "Live speech recognition in sports games by adaptation of acoustic model and language model." Interspeech. Sep. 2003, pp. 1-4.*

Huang, et al. "Spoken document retrieval using multilevel knowledge and semantic verification." Audio, Speech, and Language Processing, IEEE Transactions on 15.8, Nov. 2007, pp. 2551-2560.*

Ni, et al. "Improved large vocabulary Mandarin speech recognition using prosodic and lexical information in maximum entropy framework." Pattern Recognition, 2009. CCPR 2009. Chinese Conference on. IEEE, Dec. 2009, pp. 1-4.*

Polzin, et al. "Pronunciation variations in emotional speech." Modeling Pronunciation Variation for Automatic Speech Recognition. 1998, pp. 1-5.*

Devillers, Laurence, et al. "Real-life emotions detection with lexical and paralinguistic cues on human-human call center dialogs." Interspeech. Sep. 2006, pp. 801-804.*

Schuller, Björn, et al. "Emotion recognition from speech: putting ASR in the loop." Acoustics, Speech and Signal Processing, 2009. ICASSP 2009. IEEE International Conference on. IEEE, Apr. 2009, pp. 4585-4588.*

Truong, Khiet P., et al. "Automatic discrimination between laughter and speech." Speech Communication 49.2 , Jan. 2007, pp. 144-158.*

Vidrascu, Laurence, et al. "Real-life emotion representation and detection in call centers data." Affective computing and intelligent interaction. Springer Berlin Heidelberg, Oct. 2005, pp. 739-746.*

Schuller, Björn, et al. "Static and dynamic modelling for the recognition of non-verbal vocalisations in conversational speech." Perception in multimodal dialogue systems. Springer Berlin Heidelberg, Jun. 2008, pp. 99-110.*

Kostov, et al. "Emotion in user interface, voice interaction system." Systems, Man, and Cybernetics, 2000 IEEE International Conference on. vol. 2. IEEE, Oct. 2000, pp. 798-803.*

Pell, Marc D., et al. "Factors in the recognition of vocally expressed emotions: A comparison of four languages." Journal of Phonetics 37.4, Oct. 2009, pp. 417-435.*

Vidrascu, et al. "Detection of real-life emotions in call centers." Interspeech. vol. 2005. No. 10. Jan. 2005, pp. 1841-1844.*

U.S. Appl. No. 12/888,012, filed Sep. 22, 2010, Johnston, et al.

U.S. Appl. No. 13/847,173, filed Mar. 19, 2013, Johnston, et al.

* cited by examiner

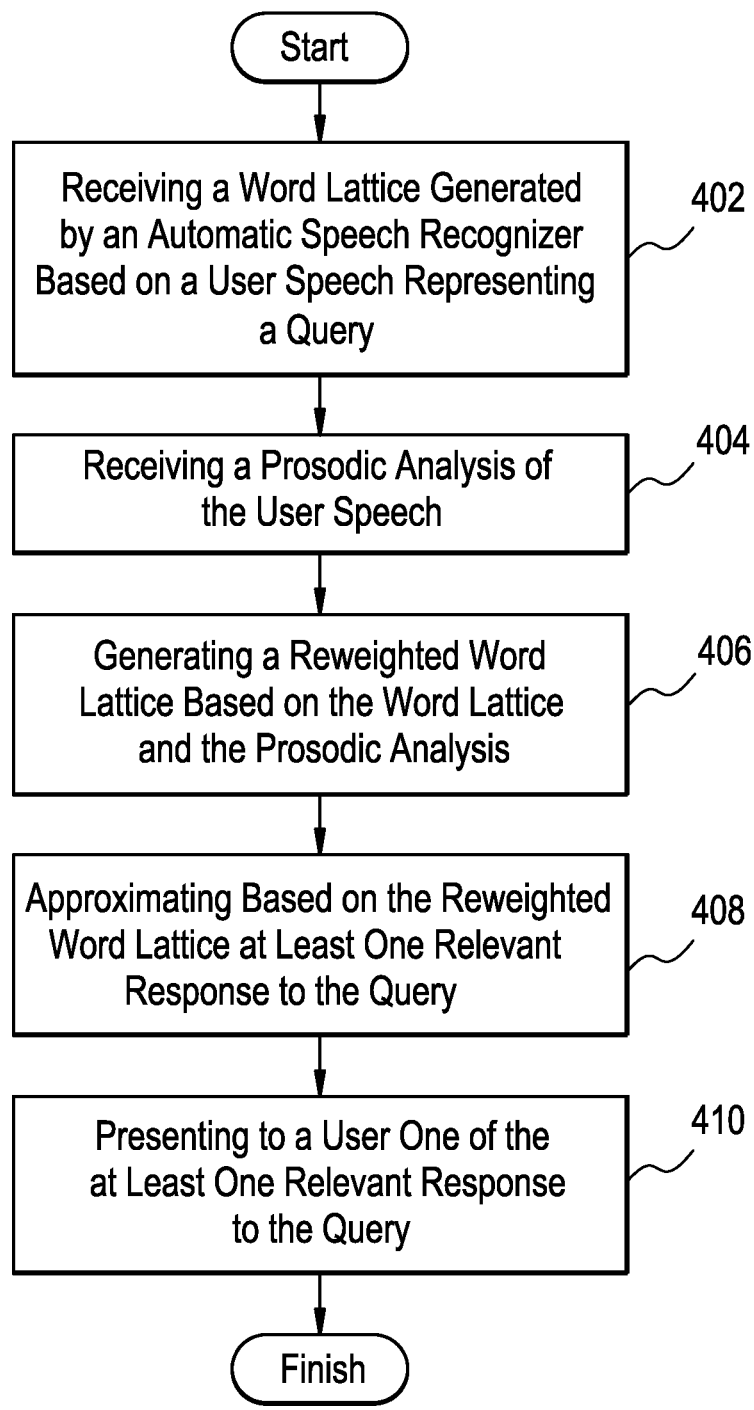

SYSTEM AND METHOD FOR USING PROSODY FOR VOICE-ENABLED SEARCH

BACKGROUND

1. Technical Field

The present disclosure relates to search in a database and more specifically to voice searches based on prosody.

2. Introduction

The heart of a voice-enabled search system is its ability to quickly and accurately recognize the meaning of a user query, whether the meaning is express or implied. Only after the true meaning of the query is captured by the system can it appropriately respond with a relevant answer. However, a user's query directed at a machine is often curt, incomplete, incoherent, or inconsistent in parts. One approach to this problem is to ask the user to repeat the query. This approach, however, may inconvenience or annoy the user as he or she would have to repeat everything that he or she says multiple times until the machine finally understands it. More importantly, the repeated query may not even be necessarily more usable than the first one. Another approach is to ask follow-up questions to clarify the meaning of the query. This approach is also problematic because, again, the user may be inconvenienced and annoyed and it takes extra time to get additional information out of the user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to approximate one or more responses to a user query in a voice-enabled search system. The system receives a spoken query uttered by a user, which is then processed through an automatic speech recognizer and a prosodic analyzer. The recognized speech and the prosody information obtained from the speech are then combined to generate a word lattice representing the meaning of the query. Additional information not directly related to the content of the user speech can be used to further flesh out the meaning of the query. This additional information can include the time of day or time of year that the query was made, the location of the speaker and known behavioral history of the speaker. A search engine then compares the word lattice with pre-indexed documents to approximate relevant responses to the query.

By tapping into the prosody information of the speech, this approach allows a voice-enabled search produce more relevant responses to a user query because of the additional information that is provided which would not be otherwise available from the query itself.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for processing speech received by an automatic speech recognizer. A system, method and non-transitory computer-readable media are disclosed which approximate one or more relevant responses to a speech query based on prosodic analysis. A discussion of a basic general purpose system or computing device in FIG. 1 which can be employed to practice the concepts is disclosed herein. Then the disclosure discusses at a high level the natural language dialog system shown in FIG. 2. A more detailed description of methods and graphical interfaces will then follow. These variations shall be discussed herein as the various embodiments are set forth. The disclosure now turns to FIG. 1.

Figure 1:
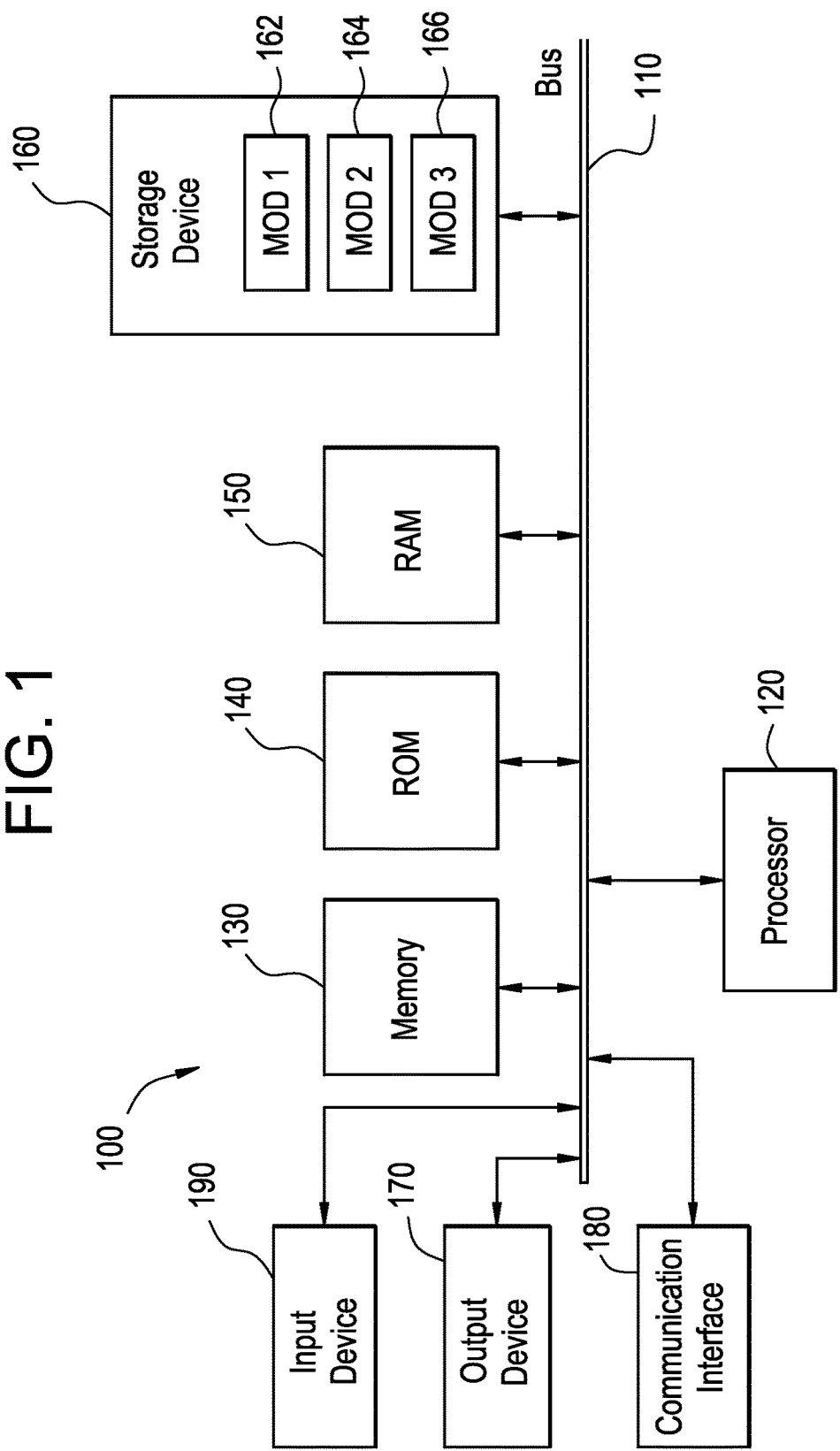
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
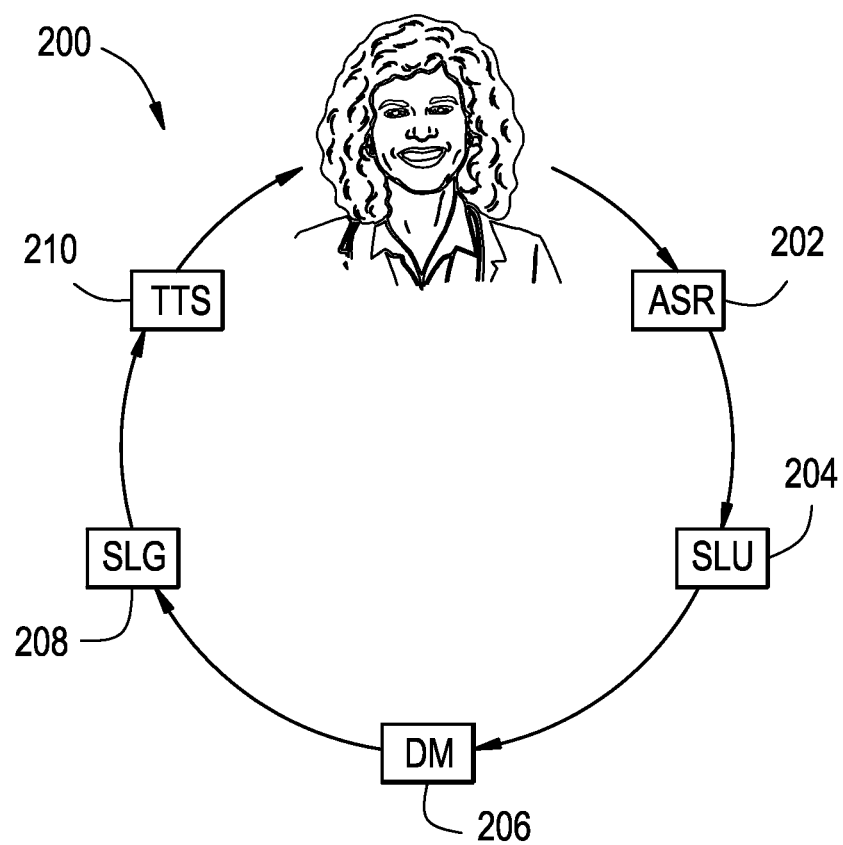
FIG. 2 is a functional block diagram that illustrates an exemplary natural language spoken dialog system.

Having disclosed some basic computing device components, the discussion now turns to the exemplary spoken dialog system. FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and a text-to-speech (TTS) module 210. The TTS module 210 can be replaced by a more generic synthesizing (SM) module which can synthesize speech in other ways than text-to-speech. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech. Speech can be produced text-to-speech, unit selection, or other known mechanism for producing speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog."

Figure 3:
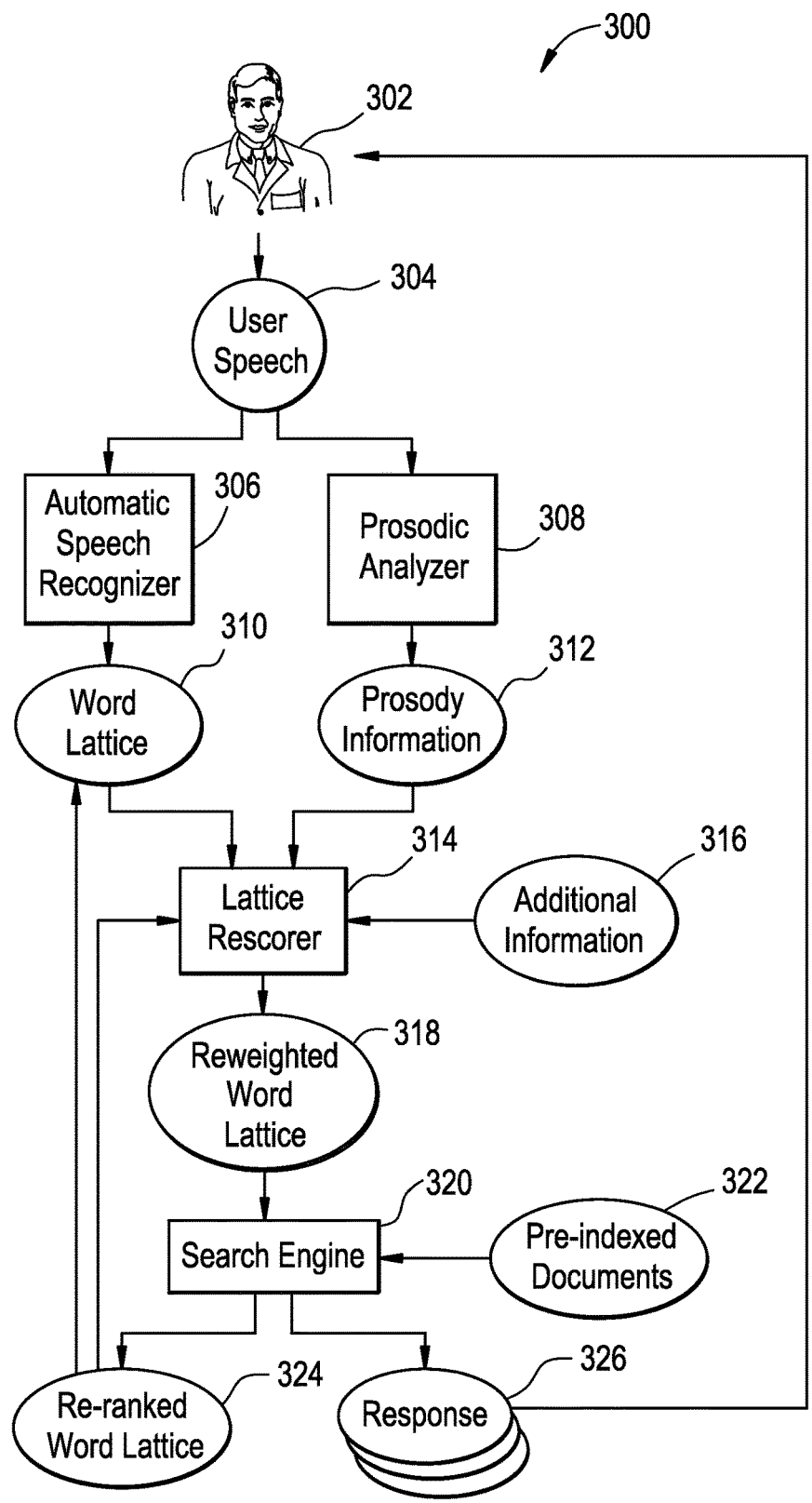
FIG. 3 illustrates an exemplary prosody-based speech analysis system with supporting infrastructure for approximating a response.

Having disclosed some basic system components and ASR components, the disclosure now turns to the exemplary prosody-based speech analysis system 300 shown in FIG. 3. In this embodiment, a user 302 utters a user speech 304, which is then received by an automatic speech recognizer (ASR) 306 and a prosodic analyzer 308. The user speech 304 can be a query or other utterance. Some examples of the user speech 304 can be "Where is the nearest ATM from the town hall?", "What are the opening hours for the ACME supermarket?" The user 302 can utter the user speech 304 to a local device such as a kiosk or to a remote device over a telecommunication network such as via a cellular phone, landline phone, Internet-enabled voice chat, and so forth. The ASR 306 and the prosodic analyzer 308 can also receive the user speech 304 in the form of pre-recorded audio data. The ASR 306 and the prosodic analyzer 308 can be two physically separate systems or two logical modules coexisting within a single system.

Based on the received user speech 304, the ASR 306 generates a word lattice 310 that best approximates the content of the user speech 304. In one aspect, this word lattice 310 is a representation of the user speech 304. In another embodiment, the ASR 306 generates a single best approximation that represents the content of the user speech 304.

The prosodic analyzer 308 also processes the user speech 304 and outputs prosody information 312. The operations of the ASR 306 and the prosodic analyzer 308 can occur concurrently, consecutive, or in a partially overlapping fashion.

In one embodiment, the prosody information 312 reflects the evaluation of the tonality, rhythm, volume, stress, intonation, speed, and so forth, of the user speech 304 and can be used to identify emphases on words and verbal quotation marks among others.

In one aspect, this evaluation can determine that one part of the speech is more salient to the intent of the user than the other parts of the speech. For example, if the user said, "What is the best birthday gift for my wife that is also very affordable?" while especially accentuating the phrase "very affordable," then the prosodic analyzer 308 can conclude that the affordable price of the gift is a priority over the quality of the gift for the user, which analysis will later help make the decision that, for example, a pair of earrings might be a better gift than an expensive sports coupe.

In another aspect, the prosody information 312 can reveal how confident the user 302 is with regards to the content of the user speech 304. Additionally, the prosody information 312 can also reveal when the user 302 has corrected his or her mistakes. For example, if a user made the query, "What is the name of the actor who played the title role in the film, 'The . . . . Amazing? . . . the Incredible Hulk' from . . . 2007? 2008!" the prosodic analyzer 308 can pick up on the way that the speaker slows down, speaks softly, stutters, etc. in some parts of the speech then abruptly picks up speed, raises voice, etc. to determine that the speaker is not so sure of the accuracy of some information given (e.g., "The . . . . Amazing? . . . ", " . . . 2007?"), was more sure in other parts (e.g., "the Incredible Hulk", "2008!"), and that he or she had corrected the mistakes.

In yet another aspect, the prosody information 312 identifies the attitude, mood, emotion, or sentiment of the user 302. For example, depending on the way that the user speech 304 is uttered, judging by the speech's tonality, rhythm, volume, stress, intonation, speed, and so forth, and also by whether the speaker is making other audible gestures such as laughing, sobbing, coughing, yawning, etc., the prosodic analyzer 308 can conclude that the user 302 is happy, sad, excited, uninterested, urgent, lonely, serious, sympathetic, disoriented, confused, playful, disingenuous, sarcastic, facetious, physically ill, mentally unstable, etc. As a further illustration, the manner in which the speech, "My house is on fire!" is uttered can reveal that the speaker is actually very serious and urgent by his or her distressed tone of voice and the rapid speed at which the speech is uttered or that the speaker is in fact trying to play a prank by the giddy tone of voice and the giggles that are associated with the speech.

In one embodiment, system-wide privacy policies can be put in place to control collection of sensitive data. In another embodiment, these policies can allow collection of personal data but restrict storing any of the information on a permanent basis. In yet another embodiment, storing some of the sensitive data on non-transitory storage medium can be allowed but they are scheduled to be deleted after a set period of time according to predetermined privacy policy. The sensitive data can be encrypted and/or anonymized so as to further protect the identity of the users. For example, a privacy policy can dictate whether to gather data with respect to the users' emotional states. Even if gathered, these data can be designated as "no storage" or "to be purged" to protect the privacy of the users. In still another embodiment, the privacy policies can be influenced by user preference. In other words, users can be given a choice of whether to opt in or opt out of some of the features that can potentially infringe upon user privacy.

The lattice rescorer 314 then incorporates the prosody information 312 into the word lattice 310 to generate a reweighted word lattice 318. In one embodiment, the prosodic information can place markers on the word lattice 310 that label, for example, which are the most emphasized words or clauses in the user speech 304. The lattice rescorer 314 can be a separate entity from either the ASR 306 or the prosodic analyzer 308, or all or part of them can be manifested in one entity.

At any rate, the information such as salient parts of the speech, confidence level and emotions of the speaker gleaned from the prosody information 312 can be used to reweight the word lattice 310 to highlight important aspects of the query, modify the meaning of the query, append additional interpretation of the query, etc. For example, the word lattice 310 can be reweighted with an assumption that emphases on words or clauses of the user speech signify importance.

In one embodiment of the disclosure, yet additional information 316 that is not directly related to and/or not described in the content of the user speech 304 can be fed to the lattice rescorer 314 and be referenced in formulating the reweighted word lattice 318. This additional information can be any and all types of information that is not directly gleaned from the analysis of the speech but nevertheless can be useful in approximating a more relevant response to the user query. For example, the time of day, the time of year, the location information about the speaker can all aid the process of reweighting the word lattice. As a further illustration, if the user query was "What should I wear for a cocktail party?" additional information that is not readily apparent from the content or the analysis of the query such as the fact that the query was received in a winter month can influence the outcome of approximating a proper answer by recommending a warmer piece of clothing.

In one embodiment, the reweighted word lattice 318 can be composed with a search finite state transducer (FST) at the search engine 320 to approximate one or more responses 326 to the query. In one aspect, the search FST is a search engine coded in the form of a finite state transducer. In another aspect, the search FST is based on pre-indexed documents 322. The search engine 320 can be a separate system from the ASR 306, the prosodic analyzer 308, and the lattice rescorer 314, or it can be integrated into one system along with any or all of the other components. The pre-indexed documents 322 can be prepared by analyzing contents of some documents for an easy machine comparison. The documents can be any text or media content that contains information that is relevant to any potential user queries. For instance, a document can be a webpage, a computer file, a scanned printed material, a photograph, an audio recording, a movie clip, and so forth.

In one embodiment, once the reweighted word lattice 318 is composed with the search FST, a new FST is produced where each arc is marked with a triple (query word, listing ID, and weight). Listing ID identifies the question-answer pair in the data repository of the pre-indexed documents.

Once the new FST is obtained, two things can happen: (1) one or more responses to the user query can be generated, and (2) a re-ranked ASR output can be produced. The two operations can happen either in parallel or sequentially. The one or more responses to the user query can be represented by N-best question-answer pairs produced by aggregating each document weight across query words. For example, an aggregation of weights across the query words "basketball", "Los Angeles" and "team" can yield a higher weight on the document that pertains to "Los Angeles Lakers" than the one that pertains to "Los Angeles Clippers".

The responses 326 can be information that provides a solution to the user's query. For example, "1927" can be a response to a user query, "When did Lindbergh complete the world's first transatlantic flight?" and "3.14159" can be a response to another user query, "What is the value of pi?" When there can be more than one relevant response to a query, the multiple responses can be ordered according to their length, relevance or any other criteria. One or more of these responses 326 can be presented to the user through text, audio, video, or any combination thereof.

Additionally, based on the new FST, a re-ranked ASR output can be produced. This output can be produced in the form of a re-ranked word lattice 324. The re-ranked word lattice 324 helps to refine the original word lattice 310 to better represent the intent of the speaker, clarify ambiguities, fix incorrectly recognized words, etc. The re-ranked word lattice 324 can be used to modify the word lattice 310, which is then fed back into the lattice rescorer 314 for further processing. Alternatively, the re-ranked word lattice 324 can be fed directly into the lattice rescorer 314.

This disclosure now turns to the exemplary method embodiment shown in FIG. 4 for using prosody for voice-enabled query. For the sake of clarity, the method is discussed in terms of an exemplary system 100 such as is shown in FIG. 1 configured to practice the method or having modules configured to control the processor to practice the method. The system 100 receives a word lattice generated by an ASR system based on a user speech representing a query (402). The user speech can be a query, and the word lattice represents the content of the query. For example, a user query can be, "What is the best service plan for me?", "How do I get to the Lincoln Memorial by train?", or "When was the last time that Mount St. Helens erupted?"

However, these principles are equally applicable to other non-query utterances. Wherever the word query is mentioned within this specification any non-query utterance can also be substituted. Specifically, when a user issues a voice command or is otherwise interacting with an automatic dialog system, the prosodic analysis approach herein can enhance the system response to these non-query utterances. An example of this would be when a user casually remarks, "Format hard drive", the prosodic analysis can determine based on the tonality, rhythm, volume and other features of the speech whether the speaker is serious about the request and reconfirm the command if necessary.

The system 100 receives a prosodic analysis of the user speech (404). The query can be received by the ASR and the prosodic analyzer via cellular phone, landline phone, Internet-enabled voice chat, and so forth. The system 100 generates a reweighted word lattice based on the word lattice and the prosodic analysis (406). The system 100 then approximates based on the reweighted word lattice at least one relevant response to the query (408). The system 100 presents to a user one of the at least one relevant response to the query (410).

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving a word lattice generated by an automatic speech recognizer processing a query, wherein the word lattice is weighted according to the query;
   identifying a policy which allows use of a user emotional state in responding to a user who produced the query;
   performing, via a processor of the automatic speech recognizer, a prosodic analysis of the query, wherein the prosodic analysis identifies an audible gesture in the query and a rhythm of words spoken in the query;
   identifying, according to the prosodic analysis, the user emotional state;
   reweighting, via the processor, the word lattice according to the prosodic analysis, the user emotional state and one of a time of day, a time of year, and a behavioral history of the user, to yield a reweighted word lattice;
   determining, via the processor and according to the reweighted word lattice, a response to the query, the response addressing the audible gesture; and
   presenting to the user the response to the query.

2. The method of claim 1, wherein the prosodic analysis further examines metalinguistic information of the query according to one or more of a tonality, a volume, a stress, an intonation, and a speed of the query.

3. The method of claim 2, wherein the prosodic analysis identifies a most salient subject matter of the query.

4. The method of claim 2, wherein the prosodic analysis assesses a confidence of the user in content of the query.

5. The method of claim 2, wherein the prosodic analysis identifies a mood of the user.

6. The method of claim 1, wherein determining the response is performed by composing the reweighted word lattice with a search finite state transducer according to a plurality of pre-indexed documents.

7. The method of claim 6, further comprising generating a finite state transducer according to composing the reweighted word lattice.

8. The method of claim 1, wherein the audible gesture comprises one of a laugh, a sob, a cough, and a yawn.

9. A system comprising:
   a processor; and
   a computer-readable storage medium having instructions stored which, when executed by the processor, cause the processor to perform operations comprising:
      receiving a word lattice generated by an automatic speech recognizer a query, wherein the word lattice is weighted according to the query;
      identifying a policy which allows use of a user emotional state in responding to a user who produced the query;
      performing a prosodic analysis of the query, wherein the prosodic analysis identifies an audible gesture in the query and a rhythm of words spoken in the query;
      identifying, according to the prosodic analysis, the user emotional state;
      reweighting the word lattice according to the prosodic analysis, the user emotional state and one of a time of day, a time of year, and a behavioral history of the user to yield a reweighted word lattice;
      determining, according to the reweighted word lattice, a response to the query, the response addressing the audible gesture; and
      presenting to the user the response to the query.

10. The system of claim 9, wherein the prosodic analysis examines metalinguistic information of the query according to one or more of a tonality, a volume, a stress, an intonation, and a speed of the query.

11. The system of claim 10, wherein the prosodic analysis identifies a most salient subject matter of the query.

12. The system of claim 10, wherein the prosodic analysis assesses a confidence of the user in content of the query.

13. The system of claim 10, wherein the prosodic analysis identifies a mood of the user.

14. A computer-readable storage device having instructions stored which, when executed by a computing device, cause the computing device to perform operations comprising:
   receiving a word lattice generated by an automatic speech recognizer processing a query, wherein the word lattice is weighted according to the query;
   identifying a policy which allows use of a user emotional state in responding to a user who produced the query;
   performing a prosodic analysis of the query, wherein the prosodic analysis identifies an audible gesture in the query and a rhythm of words spoken in the query;
   identifying, according to the prosodic analysis, the user emotional state;
   reweighting the word lattice according to the prosodic analysis, the user emotional state and one of a time of day, a time of year, and a behavioral history of the user, to yield a reweighted word lattice;
   determining, according to the reweighted word lattice, a response to the query, the response addressing the audible gesture; and
   presenting to the user the response to the query.

15. The computer-readable storage device of claim 14, wherein determining the response is performed by composing the reweighted word lattice with a search finite state transducer according to a plurality of pre-indexed documents.

16. The computer-readable storage device of claim 15, having additional instructions stored which, when executed by the computing device, result in operations comprising generating a finite state transducer according to composing the reweighted word lattice.

17. The computer-readable storage device of claim 16, having additional instructions stored which, when executed by the computing device, result in operations comprising reranking, according to the finite state transducer, the word lattice generated by the automatic speech recognizer.

* * * * *